United States Patent [19]

Teumac et al.

[11] Patent Number: 5,863,964
[45] Date of Patent: *Jan. 26, 1999

[54] FLAVOR PROTECTANT CLOSURE LINER COMPOSITIONS

[75] Inventors: Fred N. Teumac, Conyngham; Mahmood R. Rassouli; Janine M. Rusnock, both of Hazelton, all of Pa.; Anthony Irwin, Baldwinsville, N.Y.

[73] Assignee: ZapatA Technologies, Inc., Hazelton, Pa.

[*] Notice: The term of this patent shall not extend beyond the expiration date of Pat. No. 5,663,223.

[21] Appl. No.: 908,577

[22] Filed: Aug. 8, 1997

Related U.S. Application Data

[63] Continuation of Ser. No. 289,170, Aug. 11, 1994, Pat. No. 5,663,223.

[51] Int. Cl.⁶ .................................... G08K 5/15
[52] U.S. Cl. .................. 523/100; 524/110; 524/168; 524/169; 524/418; 426/66; 426/398; 428/36.92; 215/230
[58] Field of Search .................... 523/100; 524/110, 524/168, 169, 418; 426/66, 398; 215/230; 428/36.92

[56] References Cited

U.S. PATENT DOCUMENTS

| | | | |
|---|---|---|---|
| 2,825,651 | 7/1957 | Loo et al. | 99/171 |
| 3,135,019 | 6/1964 | Aichele | 18/5 |
| 3,360,827 | 1/1968 | Aichele | 18/20 |
| 3,547,746 | 12/1970 | Gwinner | 161/2 |
| 3,577,595 | 5/1971 | Smith | 18/20 |
| 3,691,113 | 9/1972 | Willis | 260/2.5 R |
| 4,041,209 | 8/1977 | Scholle | 428/500 |
| 4,104,192 | 8/1978 | Yoshikawa et al. | 252/188 |
| 4,111,323 | 9/1978 | Ichinose et al. | 215/230 |
| 4,113,652 | 9/1978 | Yoshikawa et al. | 252/428 |
| 4,127,503 | 11/1978 | Yoshikawa et al. | 252/429 |
| 4,166,807 | 9/1979 | Komatsu et al. | 252/439 |
| 4,192,773 | 3/1980 | Yoshikawa et al. | 252/429 |
| 4,199,472 | 4/1980 | Ohtsuka et al. | 252/427 |
| 4,211,681 | 7/1980 | Braun et al. | 260/29.2 |
| 4,278,718 | 7/1981 | Billings et al. | 523/100 |
| 4,279,350 | 7/1981 | King | 215/228 |
| 4,287,995 | 9/1981 | Moriya | 215/228 |
| 4,380,597 | 4/1983 | Erwied et al. | 524/109 |
| 4,536,409 | 8/1985 | Farrell et al. | 426/398 |
| 4,702,966 | 10/1987 | Farrell et al. | 428/500 |
| 4,818,577 | 4/1989 | Ou-Yang | 428/36.5 |
| 4,935,273 | 6/1990 | Ou-Yang | 428/35.7 |
| 4,968,514 | 11/1990 | Forbes | 426/106 |
| 5,075,362 | 12/1991 | Hofeldt et al. | 524/72 |
| 5,100,930 | 3/1992 | Fukui et al. | 524/770 |
| 5,106,886 | 4/1992 | Hofeldt et al. | 523/100 |
| 5,143,763 | 9/1992 | Yamada et al. | 428/36.5 |
| 5,202,052 | 4/1993 | Zenner et al. | 252/188.28 |
| 5,204,389 | 4/1993 | Hofeldt et al. | 524/72 |
| 5,227,411 | 7/1993 | Hofeldt et al. | 523/100 |
| 5,265,747 | 11/1993 | Gregory et al. | 215/349 |
| 5,308,549 | 5/1994 | Laermer et al. | 524/770 |
| 5,356,021 | 10/1994 | McBride et al. | 215/349 |
| 5,426,141 | 6/1995 | Akao | 524/110 |
| 5,663,223 | 9/1997 | Teumac et al. | 524/110 |

FOREIGN PATENT DOCUMENTS

| | | |
|---|---|---|
| 0 328 336 | 8/1989 | European Pat. Off. . |
| 0 328 337 | 8/1989 | European Pat. Off. . |
| 53-0137244 | 11/1978 | Japan . |
| 54-0034352 | 3/1979 | Japan . |
| 55-0137086 | 10/1980 | Japan ................................. 426/66 |
| 56-0028228 | 3/1981 | Japan . |
| 56-0028229 | 3/1981 | Japan . |
| 58-0096638 | 6/1983 | Japan . |
| 62-215101 | 9/1987 | Japan . |
| 1230658 | 9/1989 | Japan . |
| 2 040 889 | 9/1980 | United Kingdom . |
| 2257146 | 1/1993 | United Kingdom . |

OTHER PUBLICATIONS

Journal AWWA, Research and Technology, "Effects of Ozonation on Tastes and Odor", Oct. 1988, Christophe Anselme, et al., pp. 45–51.

Environ. Science Technology, vol. 21, No. 3, 1987, "Drinking–water Treatment With Ozone", William H. Glaze, pp. 224–230.

Journal AWWA, Research and Technology, Evaluation of Ozonation By–products From Two California Surface Waters, William H. Glaze et al., Aug. 1989, pp. 66–73.

Journal AWWA, Research and Technology, "Ozonation: Assessing Its Role in the Formation and Control of Disinfection By–products", Joseph G. Jacangelo, et al., Aug. 1989, pp. 74–84.

Roche® Brochure, "Why is Ronotec® 201 the Smarter AO?", Oct. 1992.

Roche® Bulletin—Product Data, "Ronotec® 201", Sep. 29, 1989.

*Primary Examiner*—Andrew E. C. Merriam
*Attorney, Agent, or Firm*—Pennie & Edmonds LLP

[57] ABSTRACT

A liner composition for a potable fluid container closure element which includes an inorganic sulfite such as sodium sulfite and/or a tocopherol compound such as dl-α-tocopherol (vitamin E) for preventing off-flavors due to the presence of aldehydes in the fluid. Also, a potable fluid container of a reservoir element for containing a potable fluid, the reservoir element having an opening, a closure element capable of being attached to the opening, and the liner composition associated with the closure element. Also, a method of improving the taste of a potable fluid such as bottled water by use of the container and one of the previously described liner compositions associated therewith. Also, an improved method for processing the composition into closure liners based upon the prevention of the development of off-flavor-causing substances therein.

11 Claims, No Drawings

FLAVOR PROTECTANT CLOSURE LINER COMPOSITIONS

This is a continuation of application Ser. No. 08/289,170, filed Aug. 11, 1994, now U.S. Pat. No. 5,663,223.

FIELD OF THE INVENTION

The present invention relates to plastic compositions that are intended for use as liners in closures for potable fluid containers such as bottled water and beer. The liner includes certain additive compositions that protect against the development during processing of the liner and the container of off-flavor in the potable fluid that would otherwise result from the reaction of oxygen with the plastic liner composition or components thereof.

BACKGROUND OF THE INVENTION

Crown liner technology

Current crown liner technology includes the in situ molding of a thermoplastic liner material directly in the crown which will later be used for bottling beer or other beverages. Such liners are primarily made of polyvinyl chloride ("PVC") in the United States and of thermoplastics that do not contain chlorine, such as EVA or polyethylene ("PE"), in Europe and Japan. A conventional apparatus for making lined crowns is the Za-Matic® Model 1400A (available from ZapatA Industries, Inc.) described in U.S. Pat. Nos. 3,135,019, 3,360,827, and 3,577,595. The liner compositions may be based upon plastics such as, for instance, PVC, EVA, or PE, and may include those of U.S. Pat. No. 3,547,746.

PVC compositions with or without additives as stabilizers or for imparting certain properties are known in the art. For instance, U.S. Pat. No. 4,380,597 discloses a stabilized thermoplastic composition of PVC or mixed polymers that may include ascorbates or gluconates as stabilizer additives. These stabilizers are added not to absorb oxygen from inside packages made of the polymer but to prevent breakdown of the polymer itself. U.S. Pat. No. 4,211,681 discloses shaped articles, for instance films or tubes, that include high molecular weight poly(ethylene oxide) polymers with stabilizers of ascorbic acid, 2,3-butylhydroxyanisoles, and the like. Japanese Patent Application No. 62-215,101 discloses a deodorizing fiber obtained by treating thermoplastic fibers with inorganic particles of divalent ferrous iron and L-ascorbic acid. U.S. Pat. No. 4,278,718 discloses a sealing composition for beverage containers consisting of a vinyl chloride resin, a plasticizer, and a metal oxide.

It is known to use hydrazides such as OBSH as a blowing agent in the liner composition of a closure element of a potable fluid container. Blowing agents are chemicals that are added to plastics or rubbers for generating inert gas upon decomposition, causing the resin to assume a cellular structure. For example, adding 4-4'-oxybis (benzenesulfonyl hydrazide) ("OBSH") to the liner of a closure element of a container for bottled beverage and decomposing the OBSH to produce small bubbles (foam) of nitrogen gas which are trapped inside the liner provides a sponginess to the material. When used as a liner of a closure element of the container, an improved seal is achieved.

The liners for most beverage closures are based either on PVC or EVA, although other materials have been used too. For instance, U.S. Pat. No. 4,968,514 teaches that polyurethanes can be used to make liners for metal-shelled beer bottle crown caps. These polymer bases can be compounded to give adequate processing properties and product performance, utilizing among other additives heat stabilizers, antioxidants, and lubricants. Naturally occurring fatty acids are often used as lubricants in liner formulations. Fatty acids are separated into individual products and purified by distillation. Because of the wide range of individual acids occurring in nature, a distillation fraction will contain several fatty acids. Some of the impurities contain unsaturation at the 4-, 5-, 6-, 7-, or 8-carbon position. The fatty acids are converted to ester or amide derivatives which likewise contain mid-chain unsaturation. When used as lubricants in liner formulations, the fatty acid derivatives are subject to oxidation at the mid-chain unsaturation by oxygen or other oxidizing agents in the beverage or in the air that is enclosed along with the beverage in the container. Such oxidation results in aldehydes, some of which have very low flavor thresholds. Such liners, however, are adequate for many beverage products in that their contribution of off-flavor to the beverage is not noticeable.

Some beverages, though,—notably, mineral waters—have such delicate bouquets that they cannot tolerate even the relatively slight off-flavors that can be generated with conventional liners. The polymeric cap liner of the container is a source of double-bond containing precursors that react with oxygen in bottled water. Polymeric cap liners typically contain a number of plasticizers, heat stabilizers, lubricants, antioxidants, blowing agents, and pigments, some or all of which contain double bonds that are susceptible to attack by oxygen. For example, the liner formulations for twist-off caps typically comprise oleamide-type lubricants. The double bonds in such oleamides are readily susceptible to attack by oxygen, resulting in off-flavored producing medium-chain-length aldehydes. Also, fatty acids or derivatives of fatty acids of liner compositions react with oxygen to form off-flavored aldehydes. Other compounds often found in polymeric cap liners which are susceptible to attack from oxygen include activated aromatic compounds such as phenols, and other double bond containing compounds such as ketones, amides, erucic acid, etc. The resulting aldehydes are responsible for the fruity tastes and odors often found in bottled water.

In order to produce bottled drinking water, it is necessary to disinfect the water so as to remove the microorganisms that would otherwise grow therein. In the past, water was disinfected using chlorine. However, the use of chlorine invariable resulted in the production of trihalomethanes such as chloroform which have been shown to pose a serious health risk. Alternatively, water bottling companies can use ozone as a disinfectant instead of chlorine to kill any microorganisms present in the water itself. Thus, the bottled water usually contains ozone in trace amounts. Typically, ozone is present in an amount of about 0.1 to 0.4 mg/l. These trace amounts kill the microorganisms so that it is not necessary for the water to be pasteurized. In addition, ozone oxidizes many nuisance compounds or contaminants in water supplies.

Drinking water standards in the United States specify that drinking water should not have any smell or taste. As shown by C. Anselme et al. in *J. American Waterworks Association,* 80, 45–51 (1988), the intensity of a fruity off-flavor correlates strongly with the total concentration of aldehydes present in the water.

Ozone also reacts with compounds which contain double bonds, such as alkenes, yielding corresponding aldehydes as the major oxidation product. As noted above, those aldehydes are responsible for the fruity tastes and odors that are found in bottled water.

While one solution to this problem is to remove the compounds that are reactive with oxygen, this solution is not practical since the liner would not possess the desired properties to properly seal the bottle. While the presence of off-flavor substances may be more readily remarked in water than in more strongly flavored beverages such as beer, the presence of such substances can adversely affect the taste of the more strongly flavored beverages. Accordingly, a need exists for an improved liner which can protect against the development of an off-flavor in bottled water or other fluids.

Oxygen-related problems in beer generally

In packaging oxygen-sensitive materials such as foodstuffs, beverages, and pharmaceuticals, oxygen contamination can be particularly troublesome. Care is generally taken to minimize the introduction of oxygen or to reduce the detrimental or undesirable effects of oxygen on the product. Carbon-carbon double bonds are particularly susceptible to reaction with active oxygen species. Such carbon-carbon bonds are often found in foods and beverages, pharmaceuticals, dyes, photochemicals, adhesives, and polymer precursors. Virtually any product that has complex organic constituents will contain such carbon-carbon double bonds or other oxygen-reactive components, and hence can undergo oxidative reactions.

Where the products of the oxidative reactions adversely affect the performance, odor, or flavor of the products, then removing the oxygen which is present (either dissolved in or trapped with the product), preventing oxygen ingress, and inhibiting the reactions of oxygen will all benefit the product. A number of strategies exist to deal with oxygen as a contaminant. The most basic is simply to remove oxygen from the product by vacuum, by inert gas sparging, or both. Such systems are used in boiler water treatment, in the orange juice and brewing industries, and in modified-atmosphere packaging of food products. This technology, while somewhat equipment intensive, can remove up to 95% of the oxygen present in air from the product or its container prior to or during packaging. However, removal of the remaining oxygen using this approach requires longer times for vacuum treatment and/or sparging and increasingly larger volumes of higher and higher purity inert gas that must not itself be contaminated with trace levels of oxygen. This makes the removal of the last traces of oxygen very expensive. A further disadvantage of these methods is a tendency to remove volatile product components. This is a particular problem with foods and beverages, in which such components are often responsible for much of the aroma and flavor.

In beer, for instance, it has been known since the 1930's that oxygen in beer adversely affects it flavor and stability. Amounts of oxygen as low as 0.1 to 0.2 ml per 355 ml container will, over time, cause darkening of the beer, an increase in chill-haze values, and significant taste changes. Oxygen's effect on beer is so strongly detrimental that many brewers go to great lengths to remove it from the bottle during the filling process. One usual technique is to remove the air via vacuum from a clean bottle, fill the bottle with carbon dioxide, flow the beer down the bottle wall into the bottle thus displacing the carbon dioxide, and finally squirting a jet of high-pressure deoxygenated water into the bottle to cause the beer to over-foam just as the cap is put on, thereby attempting to displace the remaining headspace gases with the beer's own carbon dioxide. In addition, production lines are run slowly in order to minimize the introduction of air into the headspace just before capping. All of this is expensive, and usually reduces the total oxygen concentration in the headspace to about 200–400 parts per billion. The 200–400 ppb achieved in the packaged product by careful brewers corresponds to approximately 50–100 microliters of oxygen per 355 ml bottle. Even this small quantity of oxygen is still considered to be one of the major limitations on quality and shelf life of beer today. The desired level is as close to zero as possible, but certainly below about 50 ppb.

Prior art oxygen scavenging

None of the above techniques remove or control oxygen that is dissolved in the product or leaked or permeated into the package. Compounds such as sulfur dioxide, trihydroxybutyrophenone, butylated hydroxy toluene, butylated hydroxy anisole, ascorbic acid, isoascorbic acid, and glucose oxidase-catalase have been used in an attempt to reduce the effects of oxygen when it is dissolved in beer. See, for instance, Reinke et al., "Effect of Antioxidants and Oxygen Scavengers on the Shelf-Life of Canned Beer", *A.S.B.C. Proceedings,* 1963, pp. 175–180; Thomson, "Practical Control of Air in Beer", *Brewer's Guild Journal,* Vol. 38, No. 451, May 1952, pp. 167–184; von Hodenberg, "Removal of Oxygen from Brewing Liquor", *Brauwelt International,* III, 1988, pp. 243–4.

The direct addition of such agents into beer has several disadvantages. Both sulfur dioxide and ascorbates, when added to beer, can result in production of off-flavors, thus negating the intended purpose of the addition. Many studies have been conducted on the effect of such agents on the flavor of beer. See, for instance, Klimowitz et al., "The Impact of Various Antioxidants of Flavor Stability", *MBAA Technical Quarterly,* Vol. 26, 1989, pp. 70–74; Gray et al., "Systematic Study of the Influence of Oxidation on Beer Flavor", *A.S.B.C. Proceedings,* 1948, pp. 101–112. Also, direct addition of such compounds to a food or beverage requires stating on the label that the product contains the additive—an undesirable matter with today's emphasis on "freshness" and "all natural" products.

Attempts have been made to incorporate oxygen scavenging systems in a container crown or closure. For instance, U.S. Pat. No. 4,279,350 discloses a closure liner that incorporates a catalyst disposed between an oxygen-permeable barrier and a water-absorbent backing layer. U.K. Patent Application No. 2,040,889 discloses a closure in the form of a stopper molded from ethylene vinyl acetate ("EVA") having a closed-cell foamed core that may contain water and sulfur dioxide to act as an oxygen scavenger and a liquid-impervious skin. European Patent Applications Nos. 328,336 and 328,337 disclose container closure elements, such as caps, removable panels, liners, or sealing compositions that are formed of a polymeric matrix containing an oxygen scavenger therein. U.S. Pat. No. 4,287,995 discloses a sealing member for a container that is used to preserve aqueous liquids therein. This sealing member is mounted on the cap or stopper of the container on the portion facing the contents. The sealing member contains an oxygen absorbent that is separated from contacting the contents of the container by a film that has a plurality of fine openings such that it is gas-permeable but water-impermeable at one atmosphere pressure.

U.S. Pat. No. 5,143,763 describes an approach that prevents oxygen deterioration in containerized substances that relies on the absorption of oxygen from within the container. This patent does not teach how to prevent the containerized substances from developing off flavor that is due to leaching substances from the liner.

SUMMARY OF THE INVENTION

The present invention protects containerized beverages such as beer and water from developing off-flavor due to leaching of aldehydes from the crown liner. This invention is directed to a liner composition for a closure element of a container for potable fluids such as water. The liner composition includes at least an inorganic sulfite compound or a tocopherol compound in amount sufficient to protect against the development of off-flavor in a potable fluid in the container. The preferred inorganic sulfite compound is a sulfite salt such as sodium sulfite. The preferred tocopherol compound is dl-α-tocopherol.

The invention is also directed to a potable fluid container comprising a reservoir element for containing fluid, which element has an opening, a closure element capable of being attached to the opening, and the above-described liner composition associated with the closure element. Generally, the closure has a recessed portion for receiving the container opening, and the liner is placed within the recess of the closure element between the container opening and the closure element for sealing the fluid within the container.

Another aspect of the invention relates to a method of improving the taste of a bottled fluid such as water by containing the fluid in the above potable fluid container and associating the above liner composition with the container so that the inorganic sulfite compound or tocopherol compound can react with residual oxygen in the headspace.

Still another aspect of the present invention is a method of making a liner composition for a potable-fluid-container closure element that comprises combining a thermoplastic polymer with a first flavor protectant compound of an inorganic sulfite compound or a tocopherol compound in an amount sufficient to prevent or inhibit the formation in the liner composition of off-flavor-causing substances and subsequently shaping a portion of said thermoplastic polymer into a shape that will enable it to function as a liner for a closure element and affixing said shaped thermoplastic polymer into place in or on said closure element.

DETAILED DESCRIPTION OF THE INVENTION

This invention relates in part to container closures for use in combination with means for retaining a water-containing foodstuff, beverage, chemical, or pharmaceutical product, which retaining means has at least one opening therein for filling or dispensing of the product. These container closures include a member for closing the opening of the retaining means and preventing escape of the liquid product when not desired, and a liner or gasket comprising one of the flavor protectant compositions described above being positioned adjacent the closing member. Preferably, the retaining means is a can, jar, or bottle of metal, glass, or plastic construction, and the closing member is a crown or closure.

The polymers

A wide variety of polymers may be used in accordance with the teaching of the present invention. For use in applications such as crown or closure liners, the polymer is preferably a polymeric thermoplastic, such as PVC, EVA, polyethylene terephthalate ("PET"), PE, or polypropylene ("PP"), or a polyurethane. U.S. Pat. No. 3,547,746 provides much useful disclosure about these and thus is expressly incorporated herein by reference. The PVC resins that are preferred for use as the polymer in the flavor protectant compositions of the invention are set forth in the patent at column 2, lines 35–47. This patent also discloses suitable plasticizer compounds that may be used with the thermoplastic resin along with preferred ranges thereof. In this invention, it is preferred to use an amount of plasticizer ranging from about 60 to 90 parts by weight based on 100 parts by weight of the polymer for crown liners. Depending upon the specific product to be made, the amount of plasticizer can vary from 10 to 120 parts. Specific plasticizers for PVC crown liners are recited in column 5, lines 49–53 of the patent.

The polymer should have a rate of water vapor transmission of between 0.05 and 25 g-mm/m$^2$/24 hours at 37.8° C. PVC typically provides a value of 2–12, PE between 0.1 and 1, and EVA 0.8 to 1.2. These rates are sufficient to enable the water vapor to permeate the polymer to activate the flavor protectant materials therein. The polymer should also be permeable to oxygen and have a permeability rate of between 50 and 2000, and preferably between 100 and 1500 cc-mil/100 square inches/24 hours per atmosphere pressure at 25° C. PVC provides values between 100–1400, PE about 185–500, and EVA about 830–850.

The flavor protectant agents

In the present invention, the liner composition comprises a first flavor protectant agent that is either an inorganic sulfite compound or a tocopherol compound in an amount sufficient to protect against the development of off-flavor in a potable fluid in the container. The inorganic sulfite compound may be an alkaline earth metal sulfite or an alkali metal sulfite. The alkali metal salts such as sodium sulfite are preferred. As indicated in Kirk-Othmer, *Encyclopedia of Chemical Technology*, 3rd Ed., Vol. 22, pp. 149–151 (1983), sodium sulfite is a well-known and versatile chemical. Its use pattern is 60% in sulfite pulping, 15% in water treatment (dechlorination, deoxygenation), 12% in photography, and 13% in miscellaneous uses. Various applications of sulfites are described in U.S. Pat. Nos. 2,825,651, 4,041,209, 4,113,652, 4,287,995, 4,536,409, 4,702,966, 5,075,362, 5,106,886, 5,204,389, and 5,227,411. However, none of these involves the use of sulfites in liner formulations to protect the flavor of containerized beverages.

A wide variety of tocopherol compounds can be used. The compound dl-α-tocopherol, also known as vitamin E, is structurally identified as 2,5,7,8-tetramethyl-2-(4',8',12'-trimethyltridecyl)-6-chromanol. While dl-α-tocopherol, or vitamin E, is currently the preferred tocopherol compound, other tocopherol compounds, including not only the stereo-specific isomers of α-tocopherol but also β-tocopherol, i.e., 2,5,8-trimethyl-2-(4',8',12'-trimethyltridecyl)-6-chromanol, γ-tocopherol, i.e., 2,7,8-trimethyl-2-(4',8',12'-trimethyltridecyl)-6-chromanol, and δ-tocopherol, i.e., 2,8-dimethyl-2-(4',8',12'-trimethyltridecyl)-6-chromanol may also be used in accordance with the present invention. In addition to its use as a dietary supplement, dl-α-tocopherol is marketed, for instance by Roche under the name RONOTEC 201, as an antioxidant in polymers and oils. However, there has been no suggestion that dl-α-tocopherol could be used in liner formulations to protect the flavor of containerized beverages.

The only restrictions on the inorganic sulfite compounds and tocopherol compounds for use in the liners of the present invention are that they should be compatible with the material and other components of the liner and approved by the FDA for use in contact with the fluid to be ingested. Preferably, the inorganic sulfite compound is present in the liner composition in an amount of from about 0.3 to about 5%, and more preferably 0.5 to 3%, by weight of the composition, while the tocopherol compound is present in the liner composition in an amount of from about 0.3 to about 3%, and more preferably 0.5 to 1%, by weight of the composition.

The liner composition is generally made of a material which is permeable to gases and water or water vapor. As noted above, this material would typically be a polymer, such as a thermoplastic resin. Thermoplastic resins of polyolefins such as PE and the like, PVC, EVA, and the like would allow gases such as oxygen or ozone, and water or water vapor to pass into and through the liner. The inorganic sulfite or tocopherol of the present invention protects against the development of off-flavors which would otherwise result from the formation of aldehydes due to the reaction of oxygen sources present in the potable fluid with prior art liner compositions or components thereof.

While it is contemplated in accordance with the present invention to use a single flavor protectant compound, it is often preferable to use a combination of flavor protectant compounds. The most preferred combination would be a sulfite compound and a tocopherol compound. However, additional flavor protectant compounds can often advantageously be used along with the inorganic sulfites or tocopherols according to the present invention, however. Generally, the second flavor protectant compound can be used in an amount of between about 0.1 and 5% by weight. Typical examples of such additional compounds include 1 to 2% by weight of an ascorbate such as sodium ascorbate and 1 to 3% by weight of a hydrazide compound. The preferred hydrazide is a sulfonyl hydrazide such as OBSH or p-toluene sulfonyl hydrazide. Carboxylic acid hydrazides can also be used. The use of hydrazides is disclosed in commonly assigned application Ser. No. 08/167,257, the content of which is expressly incorporated herein by reference thereto. The use of ascorbates such as vitamin C and related compounds (e.g., sodium ascorbate) is disclosed in U.S. Pat. No. 5,202,052, the content of which is also expressly incorporated herein by reference thereto.

In the present invention, the hydrazide compound is an "unactivated hydrazide," i.e., a hydrazide compound which has not been subjected to a decomposition reaction. This can occur by either adding an amount of a hydrazide compound beyond that which is needed for use as a blowing agent or by processing the liner so as to not decompose the hydrazide compound which is present.

Hydrazides of organic sulfonic acids have been found to be useful in the present invention. Both aliphatic and aromatic sulfonic acids can be used, with one or both —NH$_2$ groups of the hydrazine molecule being substituted with alkyl or aryl radicals. The most preferred compound is a sulfonyl hydrazide, such as OBSH, since it has FDA approval for applications and articles which come into contact with food or beverages. Other sulfonyl hydrazides such s p-toluene sulfonyl hydrazide can be used, if desired. Thus, the useful hydrogens may optionally be substituted by other organic moieties.

Other hydrazides which may be used to reduce the off-flavor of bottled water include carboxylic acid hydrazides of the general structure shown below.

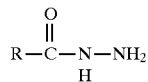

where R is hydrogen, a straight chain or branched alkyl or alkenyl group of 1 to 20 carbon atoms, a phenyl group, which is substituted or unsubstituted, or the like.

The only restrictions on the hydrazide compounds for use in the liners of the present invention are that the hydrazide compound be compatible with the material and other components of the liner and that the compound be FDA approved for use in contact with the fluid to be ingested. Preferably, the hydrazide compound may be present in the liner composition in an amount of from about 0.1 to about 1% by weight of the composition.

Since the liner composition may also include a hydrazide compound for use as a blowing agent, the composition must be formulated so that the amount of hydrazide compound that is decomposed is less than the total amount of hydrazide compound that is added to the liner composition. This decomposition may be activated by an activator or by heat. In the present invention, an activator for decomposing the hydrazide compound is added in an amount that is less than that necessary to activate the total amount of hydrazide compound in the liner composition. Examples of typical activators include carbonates, glycols, ureas, acids, alkanolamines, oxidizing agents such as peroxides. In particular, carbonates such as sodium carbonate are preferred activators. The present invention may also include at least one blowing agent other than the unactivated hydrazide compound, if desired.

Manufacture

Preferred uses of the compositions of the invention are as liners or gaskets in crowns or closures for capping beverage bottles. Entire closures may also be made of plastics containing compositions of the invention, for instance all plastic screw-on threaded caps for soft drink bottles, and the like. Another preferred use of the composition of the invention is as a gasket or liner applied to an aluminum or plastic closure or metal crown for plastic or glass bottles.

Conventional bottle closure linings are made of a thermoplastic material, such as PVC or EVA, polyolefins such as PE or PP, or blends thereof. In order to attain the optimum combination of moldability, resilience, sealability, etc., these materials are formulated to include plasticizers, heat stabilizers, lubricants, blowing agents, antioxidants, pigments, and other additives. These additive components are well known to one skilled in the art so that a detailed description is not needed herein.

As noted above, PVC liners are well known for use in crowns as described in the production of crowns using the Za-Matic machines. There is also well know technology for making aluminum or plastic closures containing EVA liners. The disclosure of U.S. Pat. No. 3,547,746 is likewise useful for its teachings of crown liner manufacturing techniques, and thus is expressly incorporated herein by reference thereto on this point as well. In addition to this crown liner manufacturing method, which is generally used for PVC, EVA, or PE liners, many other devices can apply liners by plastisol spin-lining or various hot molding techniques. The present invention is easily applicable to both gasketing/coating/sealing materials for metal crowns or closures, such as beer bottle crown or soda closure liners, and to containers or closures comprised primarily of plastic materials.

Formulations according to the present invention may be prepared for use in a Za-Matic machine for application as a liner to a beer bottle crown. The PVC resin is placed in a dry mix kettle, and plasticizer is added with continuous heating and mixing. All other additives, including the flavor protectant material, are then gradually introduced into the resin to form a dry blend. This dry blend is place into an extruder and pelletized to form the liner compound that is added to the Za-Matic machine to form liners on metal bottle crowns.

U.S. Pat. No. 5,202,052 describes this and other liner manufacturing procedures that may be adapted by those skilled in the art to manufacture the liners of the present invention. The inorganic sulfite compound or tocopherol compound may be admixed into the liner or can be coated thereon or otherwise associated therewith.

Preferably, the potable fluid container of the present invention contains a potable fluid, most preferably beer or water. Preferably, the potable fluid container has ozone added thereto. In the case of water, the ozone is preferably added in trace amounts, such as from about 0.1 to 0.5 mg/l.

EXAMPLES

The foregoing and other objects, features, aspects, and advantages of the present invention will become more apparent from the following detailed nonlimiting examples of the present invention.

In order to demonstrate that the addition of inorganic sulfite compositions and tocopherol compositions in accordance with the present invention permits the formulation of liners that impart less off-flavor to beverages, test samples were prepared and compared to controls. It is emphasized that the taste of the water, even though it has important commercial consequences, may be regarded as an indicator of the presence in the liners of extractable off-flavor-causing substances.

A fresh control was prepared for each experiment. A panel of trained flavor tasters evaluated the samples along with an outside consultant. The liner materials were evaluated for improved flavor over the control after one day and long term storage.

In each example, twelve-ounce flint glass bottles were filled with 350.0±0.5 ml. of artesian spring water. Into each bottle for each test cell were placed four bottle cap liners made of the lining material of interest, formulated as in Table 1, and the bottle was crowned with the closure that was lined with the same material that was placed inside the bottle. Since each of the four liners placed inside of the bottle presented both sides to the liquid, with the liner used in the cap the effective number of liners contributing to the concentration of materials of interest in each cell was nine times that which would be achieved with a lined cap alone.

The bottles were pasteurized at 140° F. for 20 minutes, cooled to 90° F., and stored at room temperature for various periods of time, up to sixteen days. After the storage period, the water was evaluated by the flavor panel for any off-flavors. The intensity of the off-flavor was scored by each panelist on a scale of 0 (No detectable off-flavor) to 3 (intense off-flavor). The individual panelists scores were averaged to determine the panel's overall score for each product. The control was prepared in the same manner as the test samples.

Example 1

The effect of a combination of sodium sulfite and dl-α-tocopherol in closure liners was evaluated in this Example. The results of the flavor evaluations are shown in Table 1.

TABLE 1

|  | Control | 1 | 2 | 3 | 4 |
| --- | --- | --- | --- | --- | --- |
| FORMULATIONS: |  |  |  |  |  |
| PVC Resin | 200.00 | 200.00 | 200.00 | 200.00 | 200.00 |
| Plasticizer | 120.00 | 120.00 | 120.00 | 120.00 | 120.00 |
| Stabilizer | 2.00 | 2.00 | 2.00 | 2.00 | 2.00 |
| Lubricant | 4.00 | 4.00 | 4.00 | 4.00 | 4.00 |
| Silica Pigment | 0.61 | 0.61 | 0.61 | 0.61 | 0.61 |
| Sodium Sulfite | 0.00 | 1.65 | 1.65 | 3.30 | 3.30 |
| dl-α-Tocopherol | 0.00 | 1.65 | 3.30 | 1.65 | 3.30 |
| totals | 326.61 | 329.91 | 331.56 | 331.56 | 333.21 |
| EVALUATIONS: | Flavor Intensity Ratings (Scale 0–3) | | | | |
| 1 Day | 1.95 | 2.3 | 1.2 | 1.7 | 2.5 |
| 5 Days | 2.0 | 0.5 | — | — | 0.0 |
| 14 Days | 2.0 | — | 0.5 | 0.0 | — |

The results reported in Table 1 indicate that liner formulations containing a combination of inorganic sulfite compound and tocopherol in accordance with the present invention generally exhibit significantly less flavor contamination over time than do similar formulations that do not contain the inorganic sulfite and tocopherol combination. Thus it is apparent that the incorporation of said combination into the liner composition has forestalled the formation of extractable off-flavor-causing substances in said liner composition.

Example 2

The effect of a combination of sodium sulfite and a hydrazide—specifically OBSH—in closure liners was evaluated in this Example. The results of the flavor evaluations are shown in Table 2.

TABLE 2

|  | Control | 5 | 6 |
| --- | --- | --- | --- |
| FORMULATIONS: |  |  |  |
| PVC Resin | 200.00 | 200.00 | 200.00 |
| Plasticizer | 120.00 | 120.00 | 120.00 |
| Stabilizer | 2.00 | 2.00 | 2.00 |
| Lubricant | 4.00 | 4.00 | 4.00 |
| Silica Pigment | 0.61 | 0.61 | 0.61 |
| Sodium Sulfite | 0.00 | 1.65 | 3.30 |
| OBSH | 0.00 | 0.65 | 0.65 |
| totals | 326.61 | 328.91 | 330.56 |
| EVALUATIONS: | Flavor Intensity Ratings (Scale 0–3) | | |
| 5 Days | 1.5 | 0.4 | 0.3 |
| 14 Days | 0.5 | 0.0 | 0.0 |

The results reported in Table 2 indicate that liner formulations containing an inorganic sulfite compound in combination with OBSH result in the least flavor contamination than do similar formulations which do not contain the inorganic sulfite and OBSH components. Thus it is apparent that the incorporation of said combination into the liner composition has forestalled the formation of extractable off-flavor-causing substances in said liner composition.

Example 3

The effect of a combination of dl-α-tocopherol and OBSH on closure liners was evaluated in this Example. The results of the flavor evaluations are reported in Table 3.

TABLE 3

|  | Control | 7 | 8 |
| --- | --- | --- | --- |
| FORMULATIONS: |  |  |  |
| PVC Resin | 200.00 | 200.00 | 200.00 |
| Plasticizer | 120.00 | 120.00 | 120.00 |
| Stabilizer | 2.00 | 2.00 | 2.00 |
| Lubricant | 4.00 | 4.00 | 4.00 |
| Silica Pigment | 0.61 | 0.61 | 0.61 |
| dl-α-Tocopherol | 0.00 | 1.65 | 3.30 |
| OBSH | 0.00 | 0.65 | 0.65 |
| totals | 326.61 | 328.91 | 330.56 |
| EVALUATIONS: | Flavor Intensity Ratings (Scale 0–3) | | |
| 2 Days | 2.3 | — | 0.6 |
| 5 Days | 1.5 | 0.2 | — |
| 14 Days | 1.5 | 1.0 | 1.0 |

The results reported in Table 3 indicate that liner formulations containing a combination of dl-α-tocopherol and OBSH in accordance with the present invention result in less flavor contamination than do similar formulations which do not contain the dl-α-tocopherol and OBSH components. Thus it is apparent that the incorporation of said combination into the liner composition has forestalled the formation of extractable off-flavor-causing substances in said liner composition.

Example 4

The effect of a combination of sodium sulfite and sodium ascorbate on closure liners was evaluated in this Example. The results of the flavor evaluations are shown in Table 4.

TABLE 4

|  | Control | 9 | 10 | 11 |
| --- | --- | --- | --- | --- |
| FORMULATIONS: | | | | |
| PVC Resin | 200.00 | 200.00 | 200.00 | 200.00 |
| Plasticizer | 120.00 | 120.00 | 120.00 | 120.00 |
| Stabilizer | 2.00 | 2.00 | 2.00 | 2.00 |
| Lubricant | 4.00 | 4.00 | 4.00 | 4.00 |
| Silica Pigment | 0.61 | 0.61 | 0.61 | 0.61 |
| Sodium Sulfite | 0.00 | 1.65 | 3.30 | 10.00 |
| Sodium Ascorbate | 0.00 | 6.40 | 6.40 | 4.00 |
| totals | 326.61 | 334.66 | 336.31 | 340.61 |
| EVALUATIONS: | Flavor Intensity Ratings (Scale 0–3) | | | |
| 1 Day | 2.55 | 2.6 | 2.8 | 1.1 |
| 5 Days | 2.0 | 0.5 | 0.5 | — |
| 16 Days | 3.0 | — | — | 0.5 |

The results reported in Table 4 indicate that liner formulations containing an inorganic sulfite compound in combination with sodium ascorbate in accordance with the present invention vary over time in their effect on flavor contamination as compared to similar formulations which do not contain the inorganic sulfite and ascorbic acid components. It appears that the addition of ascorbic acid as an ascorbate enhances the effectiveness of the sulfite, particularly over longer periods of storage. Thus it is apparent that the incorporation of said combination into the liner composition has forestalled the formation of extractable off-flavor-causing substances in said liner composition.

Example 5

The effect of a combination of dl-α-tocopherol and sodium ascorbate on closure liners was evaluated in this Example. The results of the flavor evaluations are shown in Table 5.

TABLE 5

|  | Control | 12 | 13 |
| --- | --- | --- | --- |
| FORMULATIONS: | | | |
| PVC Resin | 200.00 | 200.00 | 200.00 |
| Plasticizer | 120.00 | 120.00 | 120.00 |
| Stabilizer | 2.00 | 2.00 | 2.00 |
| Lubricant | 4.00 | 4.00 | 4.00 |
| Silica Pigment | 0.61 | 0.61 | 0.61 |
| dl-α-Tocopherol | 0.00 | 1.65 | 3.30 |
| Sodium Ascorbate | 0.00 | 6.40 | 6.40 |
| totals | 326.61 | 334.66 | 336.31 |

TABLE 5-continued

|  | Control | 12 | 13 |
| --- | --- | --- | --- |
| EVALUATIONS: | Flavor Intensity Ratings (Scale 0–3) | | |
| 1 Day | 1.6 | 1.8 | 2.4 |
| 14 Days | 2.0 | 3.0 | 1.5 |

The results reported in Table 5 indicate that liner formulations containing dl-α-tocopherol in combination with sodium ascorbate in accordance with the present invention vary over time in their effect on flavor contamination as compared to similar formulations which do not contain the dl-α-tocopherol and ascorbic acid components. The best results are obtained with the higher concentrations of the tocopherol compound. Thus it is apparent that the incorporation of said combination into the liner composition has forestalled the formation of extractable off-flavor-causing substances in said liner composition.

Example 6

The addition of different amounts of sodium sulfite to the bottle crown liner described hereinabove was investigated. The results of the flavor evaluations are shown in Table 6.

TABLE 6

|  | Control | 14 | 15 |
| --- | --- | --- | --- |
| FORMULATIONS: | | | |
| PVC Resin | 200.00 | 200.00 | 200.00 |
| Plasticizer | 120.00 | 120.00 | 120.00 |
| Stabilizer | 2.00 | 2.00 | 2.00 |
| Lubricant | 4.00 | 4.00 | 4.00 |
| Silica Pigment | 0.61 | 0.61 | 0.61 |
| Sodium Sulfite | 0.00 | 1.65 | 3.30 |
| totals | 326.61 | 332.26 | 329.91 |
| EVALUATIONS: | Flavor Intensity Ratings (Scale 0–3) | | |
| 1 Day | 2.8 | 2.4 | 2.2 |
| 16 Days | 3.0 | 2.0 | 1.0 |

The results reported in Table 6 indicate that liner formulations containing an inorganic sulfite compound in accordance with the present invention result in less flavor contamination than do similar formulations which do not contain the inorganic sulfite compound, with the degree of improvement increasing with increasing amounts of sodium sulfite. Thus it is apparent that the incorporation of said combination into the liner composition has forestalled the formation of extractable off-flavor-causing substances in said liner composition.

Example 7

The addition of different amounts of dl-α-tocopherol to the bottle crown liner described above was investigated. The results of the flavor evaluations are shown in Table 7.

TABLE 7

|  | Control | 16 | 17 |
|---|---|---|---|
| FORMULATIONS: | | | |
| PVC Resin | 200.00 | 200.00 | 200.00 |
| Plasticizer | 120.00 | 120.00 | 120.00 |
| Stabilizer | 2.00 | 2.00 | 2.00 |
| Lubricant | 4.00 | 4.00 | 4.00 |
| Silica Pigment | 0.61 | 0.61 | 0.61 |
| dl-α-Tocopherol | 0.00 | 1.65 | 3.30 |
| totals | 326.61 | 328.26 | 329.91 |
| EVALUATIONS: | Flavor Intensity Ratings (Scale 0–3) | | |
| 2 Days | 2.3 | 1.6 | 1.4 |
| 14 Days | 2.5 | 1.0 | 1.0 |

The results reported in Table 1 indicate that liner formulations containing dl-α-tocopherol in accordance with the present invention result in less flavor contamination than do similar formulations which do not contain the dl-α-tocopherol. Thus it is apparent that the incorporation of said combination into the liner composition has forestalled the formation of extractable off-flavor-causing substances in said liner composition.

Example 18

Seven 200 ml water samples were each ozonized as follows. Seven samples of 206±0.5 grams of distilled water were each poured into a clean 7 ounce bottle. A Sander Ozonizer Model 25, having 25 mg per hour capacity was connected to a 100% oxygen tank via a silicone rubber tubing. The outlet of the ozonizer was connected to Teflon tubing via silicon rubber tubing to minimize the exposure of the silicon rubber to the ozone. The Teflon tubing was connected to a glass gas dispersion tube, Catalog Number 9435A of Ace Glass, Inc., Vineland, N.J., via silicone rubber tubing. The glass gas dispersion rube was immersed in water. The ozone concentration was controlled with oxygen flow and flow time. An oxygen flow of 115–121 ml with 25 mg per hour setting of ozonizer resulted in 0.4 to 0.5 mg/l (ppm) of ozone in the 7 ounce bottle of water after 3.5 minutes. The concentration of ozone was determined with an Ozone Test Kit, Hach Chemical Co. Model OZ-2, Catalog No. 20644-00, Loveland, Colo. The analytical range of ozone detection is 0.1–2.3 mg/l.

To determine whether the components of the liner are the source of off-flavor in the water samples, the components are separately added to the samples, each in an amount of 2 mg. The composition of the liner is given below in Table 8.

TABLE 8

| Component | Parts (lbs) |
|---|---|
| PVC Resin | 200 |
| Primary Plasticizer | 153 |
| Secondary Plasticizer A | 11.8 |
| Stabilizer | 2 |
| Lubricant Package | 3.37 |

Specifically, 2 mg of each one of OBSH, the primary plasticizer, the secondary plasticizer and the three components of the lubricant package are separately added to six samples, respectively. Lubricant #1 and lubricant #2 are amides of an unsaturated fatty acid, and lubricant #3 is a paraffin wax. A seventh sample was used as a control, having nothing added thereto. The bottles were immediately crowned and later tested for flavor.

The final ozone concentration before crowning was determined to be 0.4 to 0.5 mg/l. The bottles were stored at room temperature for two days. Calorimetric analysis showed that the control sometimes contained unreacted ozone after two days, while no ozone remained in any of the bottles to which the additional components had been added.

The samples were then evaluated by a taste panel, evaluating the off-flavor intensity of the samples. The results were such that the sample containing OBSH and the control had approximately the same flavor, which flavor was less than for the samples containing the secondary plasticizer and the lubricants, with the sample containing lubricant #2 having the strongest flavor of all the samples evaluated.

Example 19

Three samples of distilled water were bubbled with ozone as in Example 18 to contain a concentration of 0.4–0.5 mg/l ozone and then were crowned in a bottle with the following liners having the following formulations:

TABLE 9

| | LINER FORMULATION | | |
|---|---|---|---|
| Component | 18 | 19 | 20 |
| PVC Resin | 200 | 200 | 200 |
| Prim. Plast. | 144 | 153 | 153 |
| Sec. Plast. A | 13.2 | 11.8 | — |
| Stabilizer | — | 2 | 0.74 |
| Anti-Oxidant | 1.6 | — | — |
| OBSH | 1.4 | — | — |
| Sec. Plast. B | — | — | 11.8 |
| Lubricant Package | 9.0 | 3.37 | 5.0 |
| Pigment | — | — | 0.16 |
| Drying agent | 0.67 | — | — |

The bottles were stored at 22° C. for four days and then tasted by a taste panel for evaluating the off-flavor intensity of the samples. The results were that liner 18 had no off-flavor, liner 19 had a very weak off-flavor and liner 20 had a strong off-flavor. The superiority of liner 18, despite its lubricant package, is attributed to the presence of OBSH.

Example 20

In order to evaluate the effect of increasing temperature and time of storage, 3 bottles of distilled water were ozonized as in Example 18 and were crowned with liners 19, 19+(0.2% OBSH) and 20.

The bottles were stored for 56 days at 30° C. and were evaluated for off-flavor by a taste panel. The results were as follows:

TABLE 10

| LINER | OFF-Flavor Intensity (0–3 Scale) |
|---|---|
| 19 | 2 |
| 19 + (0.% OBSH) | 1 |
| 20 | 3 |

The OBSH containing sample was found to be clearly superior to the other samples.

Example 21

Three bottles of distilled water were ozonized as in Example 18 to contain 0.4 mg/l ozone. The bottles were capped with the following closure tapes which were made from a copolymer of ethylene vinyl acetate comprising of 10% vinyl acetate having the following formulations:

TABLE 11

CLOSURE TAPE FORMULATIONS

| Component | CT-1 | CT-2 | CT-3 |
|---|---|---|---|
| Virgin | 60% | 100% | 100% |
| Regrind EVA | 40% | — | — |
| OBSH | — | — | 0.2 |

After storage for four days at room temperature, taste tests found that CT-1 had weak off-flavor intensity, CT-2 had moderate off-flavor intensity, and CT-3 had no off-flavor intensity.

Example 22

Six bottles of water were ozonized as in Example 18 to contain a concentration of 0.4–0.5 mg/l ozone. The bottles were sealed with crown liner elements 18, 19, 19+(0.2% OBSH) and with closure tapes CT-1, CT-2, and CT-3. The bottles were then heated at 30° C. for 30 days. A taste panel then evaluated that taste of each sample for off-flavor intensity on a scale of 0–3, with 0 having no off-flavor and 3 having an intense off-flavor. The results are as follows.

TABLE 12

| CLOSURE ELEMENT | OFF-FLAVOR INTENSITY |
|---|---|
| 18 | 2.0 |
| 19 | 2.4 |
| 19 + (0.2% OBSH) | 1.7 |
| CT-1 | 2.0 |
| CT-2 | 1.6 |
| CT-3 | 0.6 |

The intensity of off-flavors of the closure tapes increased for each sample when compared to the four day, room temperature test examples. However, some protective effect of OBSH was still evident.

Example 23

Three bottles of water were ozonized as in Example 18 to maintain a concentration of 0.4 mg/l of ozone. The bottles were sealed with the following crown liner elements.

TABLE 13

| | FORMULATION | | |
|---|---|---|---|
| Component | 21 | 22 | 23 |
| PVC RESIN | 200 | 200 | 200 |
| PRIMARY PLASTICIZER | 153 | 153 | 153 |
| SECONDARY PLASTICIZER A | 11.8 | 11.8 | 11.8 |
| STABILIZER | 2 | 2 | 2 |
| OBSH | — | — | 0.7 |
| LUBRICANT PACKAGE | 3.37 | 1.28 | 3.37 |

These three bottles were evaluated for off-flavor intensity after storage for 4 days at room temperature. The taste of the formulation having the OBSH was found to be the cleanest, while the other formulations were found to have oxidized, aldehyde flavors.

Example 24

4 bottles of distilled water were ozonized as in Example 1 and were crowned with the following liners having the following compositions.

TABLE 14

| | LINER FORMULATION | |
|---|---|---|
| Component | 24 | 25 |
| PVC RESIN | 200 | 200 |
| PRIMARY PLASTICIZER | 164.8 | 164.8 |
| SECONDARY PLASTICIZER A | — | — |
| STABILIZER | 2 | 2 |
| OBSH | — | 1.85 |
| LUBRICANT PACKAGE | 3.37 | 3.37 |

The bottles were stored for 5 days at room temperature and were evaluated for off-flavor by a taste panel. The results, based on a scale of 0–3, were as follows.

TABLE 15

| LINER | OFF-FLAVOR INTENSITY |
|---|---|
| 24 | 21.5 |
| 25 | 0.3 |

Formulation 25, containing 0.5% OBSH based on the total weight of the liner formulation, was unanimously rated the best by the panel.

Although the present invention has been described in detail, it is clearly understood that the same is by way of example only and is not to be taken by way of limitation, the scope of the present invention being limited only by the terms of the appended claims.

What is claimed is:

1. A closure element for a bottled fluid, which element includes a liner composition consisting essentially of a polymer, a hydrazide compound present in a non-decomposed state and in an amount sufficient to at least partially inhibit the formation of off-flavor causing substances in the liner composition, and a further, different flavor protectant compound in an amount which, in combination with the amount of hydrazide compound, prevents or inhibits the formation of off-flavor causing substances in the liner composition, thus improving the taste of the bottled fluid compared to bottled fluids which include closure elements having liner compositions that do not include the hydrazide and further flavor protectant compounds in said amounts.

2. The liner composition of claim 1 wherein the hydrazide composition is 4,4'-oxybis(benzene sulfonyl hydrazide) and is present in an amount of between about 0.1 and 5% as weight of the liner composition.

3. The liner composition of claim 1 wherein the hydrazide compound is a sulfonyl hydrazide and the further flavor protectant compound is an inorganic sulfite compound or a tocopherol compound, said further flavor protectant compound being present in an amount of from about 0.3 to about 5% by weight of the liner composition.

4. The liner composition of claim 1 wherein the polymer is a thermoplastic resin compound selected from the group consisting of a polyolefin, polyvinyl chloride, ethylene-vinyl acetate or a mixture thereof.

5. The liner composition of claim 1 further consisting essentially of one or more of a plasticizer, a heat stabilizer, a lubricant, a blowing agent or a pigment, and the bottled fluid is beer or water.

6. A method of improving the taste of a fluid which is retained in a bottle by a closure element that includes a liner composition as a seal, which method comprises providing, in the liner composition during manufacture thereof, two different flavor protectant compounds in amounts which, in combination, are sufficient to prevent or inhibit the formation in the liner composition of off-flavor causing substances, wherein at least one compound is a hydrazide compound in a non-decomposed state, thus improving the taste of the fluid compared to bottled fluids which are retained by closure elements having liner compositions that do not include the different flavor protectant compounds in said amounts.

7. The method of claim 6 wherein the hydrazide compound is present in an amount of about 0.1 and 5% by weight of the liner composition.

8. The method of claim 7 wherein the hydrazide compound is a sulfonyl hydrazide and the other flavor protectant compound is an inorganic sulfite compound or a tocopherol compound.

9. The method of claim 8 wherein the other flavor protectant compound is present in an amount of from about 0.3 to about 5% by weight of the liner composition.

10. The method of claim 6 wherein the polymer is a thermoplastic resin compound selected from the group consisting of a polyolefin, polyvinyl chloride, ethylene-vinyl acetate or a mixture thereof.

11. The method of claim 6 which further comprises adding to the liner composition during manufacture thereof, one or more of a plasticizer, a heat stabilizer, a lubricant, a blowing agent or a pigment, and the fluid is beer or water.

* * * * *